United States Patent [19]
Yoshihara et al.

[11] Patent Number: 5,029,019
[45] Date of Patent: Jul. 2, 1991

[54] IMAGE DATA PROCESSING UNIT

[75] Inventors: Takayasu Yoshihara; Mitsuru Yamada, both of Tokyo, Japan

[73] Assignee: Jeol Ltd., Tokyo, Japan

[21] Appl. No.: 415,888

[22] Filed: Oct. 2, 1989

[30] Foreign Application Priority Data

Oct. 7, 1988 [JP] Japan ................................ 63-253450

[51] Int. Cl.$^5$ .............................................. H04N 1/40
[52] U.S. Cl. .................................. 358/447; 358/444; 358/460; 358/75
[58] Field of Search ............... 358/447, 448, 455, 456, 358/457, 458, 461, 75, 80, 444, 460

[56] References Cited

U.S. PATENT DOCUMENTS

| | | | |
|---|---|---|---|
| 4,236,178 | 11/1980 | Tiemeijer | 358/93 |
| 4,636,845 | 1/1987 | Alkofer | 358/80 |
| 4,866,514 | 9/1989 | Yeomans | 358/80 |

Primary Examiner—Edward L. Coles, Sr.
Assistant Examiner—Jerome Grant, II
Attorney, Agent, or Firm—Webb, Burden, Ziesenheim & Webb

[57] ABSTRACT

The image data processing unit supplies the image data from the memory to the look-up table, and resupplies output data from the look-up table to the look-up table by feeding it back to the input side of the look-up table. When supplying the fed-back data to the look-up table, the data once subjected to image processing is again processed by carrying out image conversion on the basis of a differently configured look-up table, by switching over the content in the look-up table from the previous content on the basis of pre-stored information. The data subjected to the desired data conversion by the look-up table is supplied to the display unit via a DA converter.

2 Claims, 2 Drawing Sheets

IMAGE DATA PROCESSING UNIT

BACKGROUND OF THE INVENTION

The present invention relates to an image data processing unit that converts image data, on the basis of the conversion data stored in a look-up table.

A charged particle beam instrument which like a scanning electron microscope has a scanning function, allows observation and photographing of specimen images. In such an instrument, secondary electron signals are obtained by scanning the specimen surface with a charged particle beam. After being amplified, those signals are converted to digital signals and then stored in a memory as image data. And, as occasion demands, the image data is read out of the memory and sent into a display unit such as a cathode ray tube. A specimen image is thus displayed on the screen. Such a scanning electron microscope is disclosed in U.S. Pat. No. 4,236,178.

When it is desired to adjust the contrast, brightness, or gray scale gradation of a specimen image displayed on the display unit to a level suited for observation, the image data from the memory is changed to values suited for the desired contrast, brightness, or gray scale.

FIG. 1 is the block diagram of an image data processing unit that carries out such image data conversion. In the diagram, a buffer memory 1 stores digital image data temporarily. A look-up table 2 stores the conversion data needed for executing data conversion. Look-up table 2 is used to subject the image data supplied from the buffer memory 1 to the desired conversion. A control system 3 gives the look-up table 2 a command as to what type of data conversion is to be carried out. A digital-to-analog converter 4 converts the converted image data to an analog signal. The image data that was converted to an analog signal by the DA converter is supplied to a display unit 6 like a CRT via an amplifier 5. This causes a specimen image based on the converted image data to be displayed on the screen of the display unit.

In the look-up table 2 are stored conversion data on single display characteristics only, such as conversion data A on the contrast, conversion data B on the brightness, and conversion data C on the gray scale. Furthermore, in the look-up table 2 are also stored composite conversion data on plural display characteristics, such as conversion data AB that combines the contrast and brightness, conversion data AC that combines the contrast and gray scale,, and conversion data ABC that combines the contrast, brightness and gray scale. The conversion data stored on the look-up table is selected by a command from the above-mentioned control system 3 in accordance with the purpose of image display. The image data from the buffer memory 1 is converted on the basis of the conversion data selected from the look-up table 2.

In an instrument of the above construction, if the types of conversion data related to a single display characteristic are numerous, the types of composite conversion data related to plural display characteristics also become numerous. This makes it impossible to store all necessary data in the conversion data storage area of the look-up table 2, thus making it impossible to completely carry out the desired data conversion. And, as the number of combinations of display characteristics increases, the creation of composite conversion data becomes more difficult, resulting in increasing the cost for creating the conversion data.

SUMMARY OF THE INVENTION

The present invention provides an image data processing unit suited for use in data conversion related to plural display characteristics.

The image processing unit based on the present invention comprises a memory for storing digital image data, a look-up table for converting the image data coming from the memory, a DA converter that converts signals obtained after data conversion by the look-up table to analog signals, and a display unit that displays images based on the output of the DA converter. A circuit is provided to feed back the output data from the look-up table to the memory at the input side of the table to thereby re-supply it to the look-up table. Switches control the content of conversion data in the look-up table such that the data resulting from the previous conversion is converted by different data.

DESCRIPTION OF THE PREFERRED EMBODIMENTS

Figure 1:
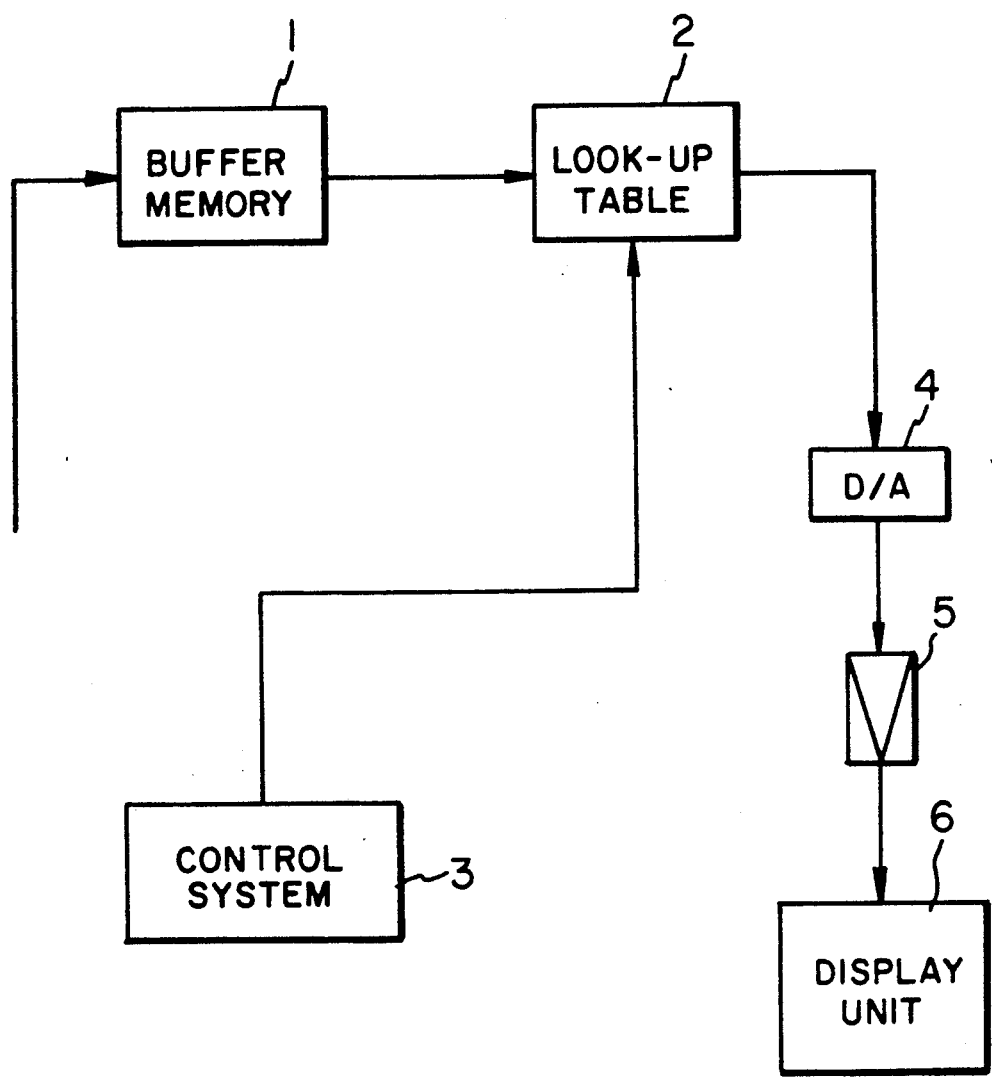
FIG. 1 is a block diagram to explain an example of a conventional image data processing unit.
Figure 2:
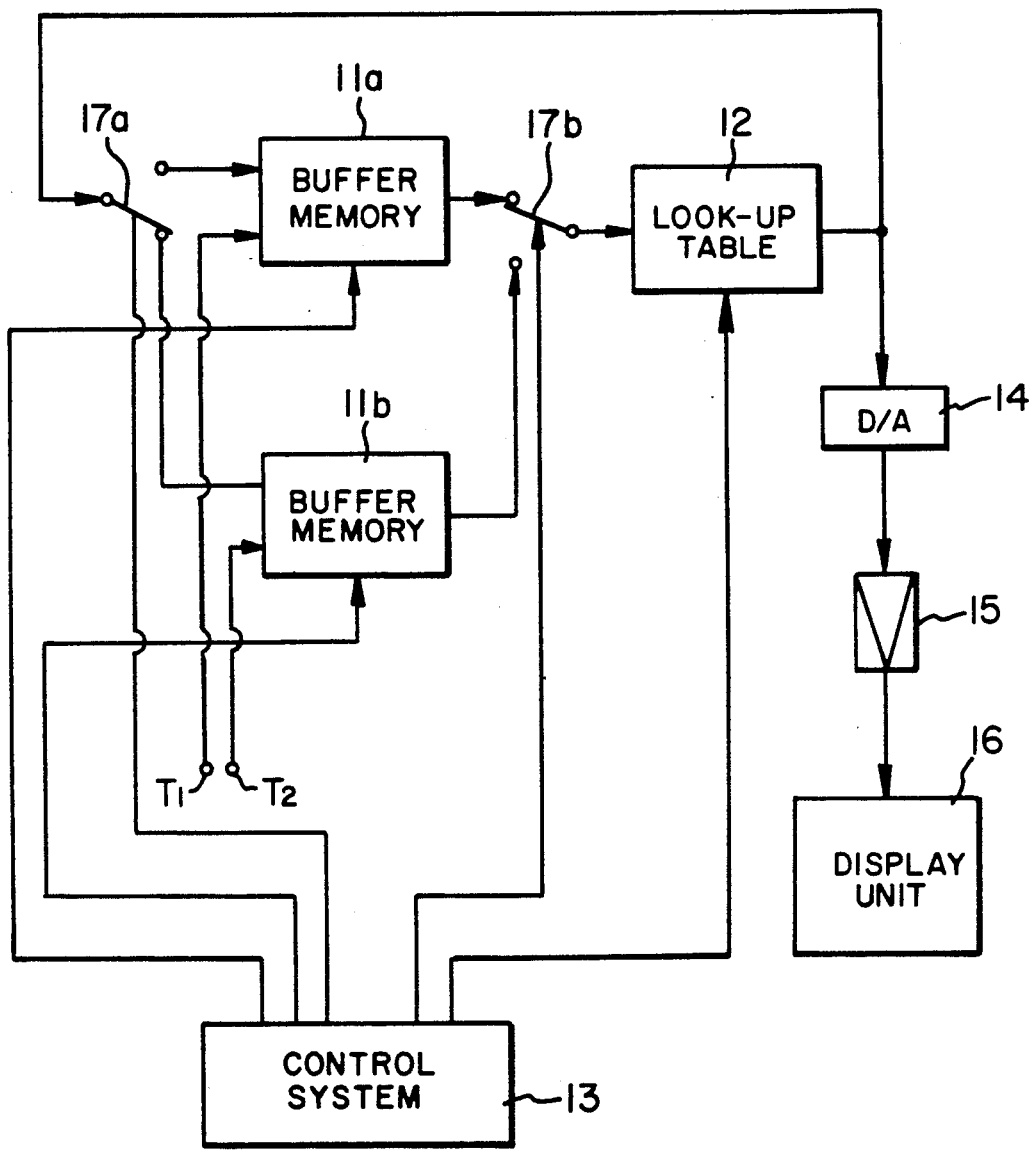
FIG. 2 is a block diagram to explain one embodiment of image data processing unit based on the present invention.

FIG. 2 is a block diagram to explain one embodiment of the image data processing unit based on the present invention. Buffer memories 11a and 11b store digital image data temporarily. A look-up table 12 stores conversion data on single characteristics only, such as conversion data A on the contrast, conversion data B on the brightness, and conversion C on the gray scale. A control system 13 gives the look-up table 12 a command as to what type of data conversion is to be carried out. The image data supplied from the buffer memories to the look-up table 12 is converted on the basis of the data conversion type which is specified by the control system. A DA converter 14 converts the converted image data to an analog signal. The image data that was converted to an analog signal by the DA converter is supplied to a display unit 16 such as a CRT via an amplifier 15. As a result, an image based on the image data subjected to the desired data conversion is displayed on the screen of the display unit. A data selector 17a is positioned between the buffer memories 11a and 11b to switch over the receiver of an output signal from the look-up table. A data selector 17b connects either one of the outputs from the buffer memories 11a and 11b to the input terminal of the look-up table 12.

Below is given a description of data conversion related to plural display characteristics or composite image data conversion that is carried out in an image data processing unit of the above-mentioned construction. For instance, when carrying out composite conversion that combines conversions for the contrast, brightness and gray scale, the operator successively inputs beforehand conversion data on the contrast, conversion data on the brightness, and conversion data on the gray scale to the control system 13. Next, under a command from the control system 13, digital image data x that is stored in another memory (not shown) is read out and supplied to the buffer memory 11a via an input terminal T1. Furthermore, under a command from the control system 13, the data selector 17a switches over the buffer memory input to the 11b side and the data selector 17b switches over the buffer memory output to the 11a side. And, under a command from the control system 13, the image data x stored in the buffer memory 11a is supplied to the look-up table 12 via the data selector 17b. In the look-up table 12, the image data x is first converted on the basis of the conversion data on the contrast, which is specified by the control system 13. The converted data (x·A) is fed back via the data selector 17a to the buffer memory 11b for temporary storage. At the same time, the converted data (x·A) is supplied to the display unit 16 via the AD converter 14 and the amplifier 15, and then an image based on the contrast-converted data (x·A) is displayed.

At this time, under a command from the control system 13, the data selector 17a switches over the buffer memory input to the 11a side and the data selector 17b switches over the buffer memory output to the 11b side. On the other hand, the data (x·A) stored in the buffer memory 11b is again supplied to the look-up table 12 via the data selector 17b. In the look-up table 12, the data (x·A) is converted on the basis of the conversion data on the brightness, specified by the control system 13. The converted data (x·A·B) is fed back via the data selector 17a to the buffer memory 11a for temporary storage. At the same time, the converted data (x·A·B) is supplied to the display unit 16 via the AD converter 14 and the amplifier 15, and an image based on data converted in the contrast and brightness is displayed. At this time, under a command from the control system 13, the data selector 17a switches over the buffer memory input to the 11b side and data selector 17b switches over the buffer memory input to the 11a side. On the other hand, the data (x·A·B) stored in the buffer memory 11a is again supplied to the look-up table via the data selector 17b. In the look-up table 12, the data (x·A·B) is converted on the basis of the conversion data on the gray scale, specified by the control system 13. The converted data (x·A·B·C) is fed back via the data selector 17 to the buffer memory 11a for temporary storage. At the same time, the converted data (x·A·B·C) is converted to analog data by the AD converter 14 and then supplied to the display unit 16 via the amplifier 15. Consequently, an image based on data converted in the gray scale, contrast and brightness is displayed on the display unit 16.

As is clear from the above explanation, the present invention makes it possible to feed back data once subjected to image processing to the look-up table and carry out image conversion on the basis of another selected conversion. This is because the present invention is provided with a circuit that supplies the output signal from the look-up table by feeding it back to the input side of the look-up table, and with a control system that switches over the content of conversion in the look-up table from the previous content of conversion on the basis of the pre-stored information when supplying the fed-back signal to the look-up table. As a result, repetition of the above operation allows various combinations of image data processings to be carried out on the original image data.

Consequently, with the image data processing unit based on the present invention, it suffices to store in the look-up table only the conversion data related to single display characteristics. There is no need to store in the look-up table composite conversion data related to plural display characteristics, as with conventional units. This reduces the volume of conversion data to be created, allowing the effective use of the data storage area in the look-up table. Also, since it is possible to apply various combinations of image data processings to the original image data, the desired conversion (image data processing) can be carried out simply and perfectly. Furthermore, reduction in cost can be achieved because there is no need to create hard-to-create composite conversion data having many combinations of display characteristics.

Having thus defined our invention with the detail and particularity required by the Patent Laws, what is desired and claimed to be protected by Letters Patent is set forth in the following claims.

What is claimed is:

1. In an image data processing unit comprising a memory to store digital image data, a look-up table means for converting the image data supplied from the memory, a DA converter for converting signals corresponding to the data converted by the look-up table means, and a display unit that displays an image based on the output of the DA converter, the improvement comprising:
    a) said memory for storing digital image data being divided into two portions comprising first and second buffer memories each storing an entire digital image,
    b) first switch means to select which of the first and second buffer memories will supply its entire stored image data to the look-up table means,
    c) means to feed back the output of the look-up table means to either portion of the first or second buffer memory comprising a second switch means to select to which of the first or second buffer memories it will be supplied,
    d) said look-up table means storing plural sets of conversion data each set relation to a single display characteristic,
    e) means to control the selection of which set of conversion data is used by the look-up table means for conversion, and
    f) means for displaying the output image data from said look-up table means,
    whereby data converted by the look-up table means may be fed back to the memory portion from which it was not taken and then passed back to the look-up table means after a new set of conversion data is selected.

2. An image data processing unit according to claim 1 in which the look-up table stores sets of conversion data corresponding to contrast, brightness and gray scale.

* * * * *